July 21, 1925. Re. 16,117

P. H. CONRADSON

REAMER

Original Filed April 19, 1924

INVENTOR.
Prentice H. Conradson.
BY J. Clarkson
ATTORNEY

Re. 16,117

Reissued July 21, 1925.

UNITED STATES PATENT OFFICE.

PRENTICE H. CONRADSON, OF CHICAGO, ILLINOIS, ASSIGNOR TO CONRADSON TOOL CORPORATION, OF DETROIT, MICHIGAN.

REAMER.

Original No. 1,532,040, dated March 31, 1925, Serial No. 707,591, filed April 19, 1924. Application for reissue filed May 13, 1925. Serial No. 30,120.

*To all whom it may concern:*

Be it known that I, PRENTICE H. CONRADSON, a citizen of the United States, residing at Chicago, in the county of Cook and State of Illinois, have invented a certain new and useful Improvement in Reamers, of which the following is a full, clear, concise, and exact description, reference being had to the accompanying drawings, forming a part of this specification.

My invention relates to reamers.

One of the objects of the invention is to provide a practical and satisfactory construction of reamer.

In the accompanying drawings Figure 1 is a vertical section of an apparatus for making reamers embodying my invention, and also an elevation of a reamer in said apparatus;

Figure 1:
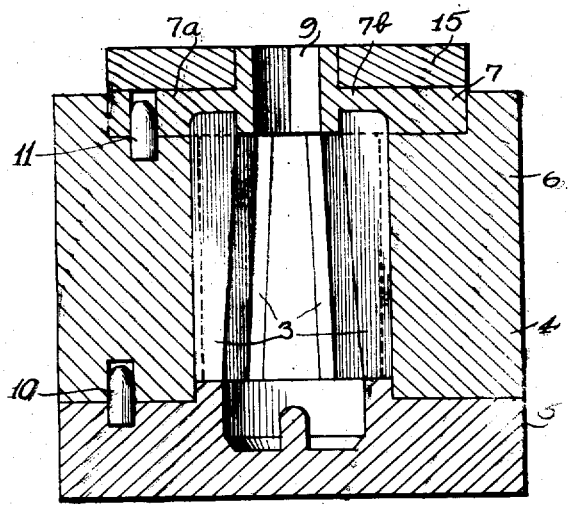
Figure 2:
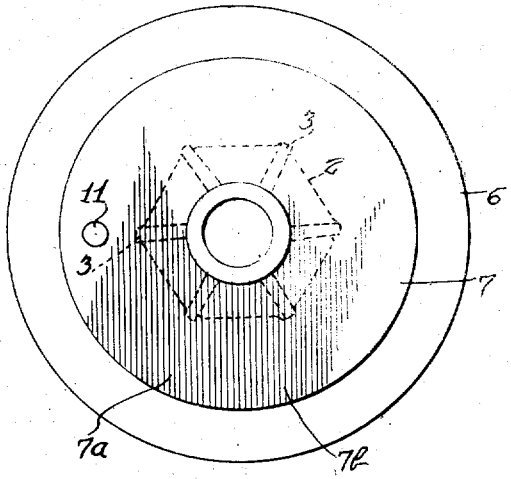
Figure 2 is a plan view of the same.
Figure 3:
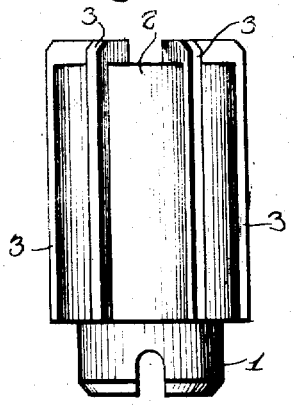
Figure 3 is a side elevation of the reamer itself.

Referring to the drawings, I show a reamer comprising a shank 1 and a body portion 2, which latter is provided with cutting blades 3—3. The latter are arranged longitudinally in the body 2 in longitudinally extending grooves.

The body 2 is composed of a metal which is hard and strong, but which melts at a comparatively low temperature, as for example, an aluminum alloy, some of the well known ones of which melt around twelve hundred to thirteen hundred degrees Fahrenheit.

Such an alloy may have a lower melting temperature than 1200 degrees Fahrenheit, however. For instance, I may employ an alloy having a melting temperature of nine hundred degrees Fahrenheit, or even lower so far as melting temperature is concerned. Nevertheless, while such alloy must have a melting temperature below the drawing temperature of the steel blades and for cutting, it must also have a sufficient tensile and crushing strength to properly support such blades in the reamer. Experience has shown that a die-casting alloy with an ultimate tensile strength of 30,000 pounds per square inch of cross sectional area and an ultimate crushing strength of 60,000 pounds per square inch of cross sectional area is requisite for my purposes. I therefore do not restrict myself to a lower melting limit of 1200 degrees Fahrenheit but may use an alloy of considerably lower melting temperature provided the same has the proper strength.

The blades 3—3 are of hard tempered steel, having of course, a high melting point, whose temper is not affected by the melting point temperature of the aluminum alloys referred to, those below thirteen hundred degrees Fahrenheit. The reamer is formed by casting the shank 1 and body 2 with the blades 3—3 in it, the aluminum alloy being run in in a melted condition, and the blades 3—3 cast in it.

This may be advantageously done by using a steel mold 4 having, for example, a base piece 5, and an annular member 6, and a top 7. The base 5 has an aperture for the shank 1 and the annular member 6 has a space or chamber adapted to form the body 2, and also has grooves for the blades 3. The top 7 has slots adapted to receive and hold the upper ends of blades 3. The top 7 is made in two pieces $7^a$ and $7^b$, so that it may be readily laid in position and removed. A washer 15 is placed upon top 7 so as to keep the two halves together. Pins 10 and 11 are employed for holding members 5, 6 and 7 in proper relative positions.

Thus the reamer may be formed by setting blades 3 in position in the mold, and holding them in such position, and then pouring molten metal into the mold, as for example, through an aperture 9 in the top of the mold. The reamer will be formed and the blades will be cast in place and will be firmly held by the shrinkage of the metal of which the body 2 is composed. The temper of blades 3 will not be affected, as molten aluminum alloy is of lower temperature than the point at which blade temper will be affected.

Thus the reamer will be more light and yet strong, effective and durable and the process of making it will be very inexpensive, and the apparatus simple.

It will be understood that changes and modifications may be made without departing from the spirit of the invention.

What is claimed is:

1. A metal cutting tool comprising a body of die cast alloy having a melting temperature of approximately 1200 degrees to 1300 degrees Fahrenheit and blades of hard tempered steel, the drawing point of the temper being above 1400 degrees Fahrenheit, said body being cast on the base portions of the blades said blades being embedded in the body for more than one half their depth.

2. A metal cutting tool comprising a body of die cast aluminum alloy having a melting temperature of approximately 1200 degrees to 1300 degrees Fahrenheit and blades of hard tempered steel, the drawing point of the temper being above 1400 degrees Fahrenheit, said body being cast on the base portions of the blades said blades being embedded in the body for more than one half their depth.

3. A metal cutting tool comprising blades of hard tempered steel and a body of cast alloy having a melting temperature below the drawing temperature of the blades and tensile and compressive strength sufficient to support said blades under conditions of use, said alloy having an ultimate tensile strength of 30,000 pounds and an ultimate crushing strength of 60,000 pounds per square inch of cross sectional area.

4. A metal cutting tool comprising blades of hard tempered steel and a body of cast alloy having a melting temperature below the drawing temperature of the blades and tensile and compressive strength sufficient to support said blades under conditions of use, the melting temperature of said alloy being below 1300 degrees Fahrenheit, and its ultimate crushing strength being at least 60,000 pounds per square inch of cross sectional area.

5. In a metal cutting tool comprising blades of hard tempered steel and a body of cast alloy having a melting temperature below the drawing temperature of the blades and tensile and compressive strength sufficient to support said blades under conditions of use, the melting temperature of said alloy being below 1300 degrees Fahrenheit, its ultimate crushing strength being at least 60,000 pounds per square inch of cross sectional area, and, its ultimate tensile strength being at least 30,000 pounds per square inch of cross sectional area.

PRENTICE H. CONRADSON.